UNITED STATES PATENT OFFICE.

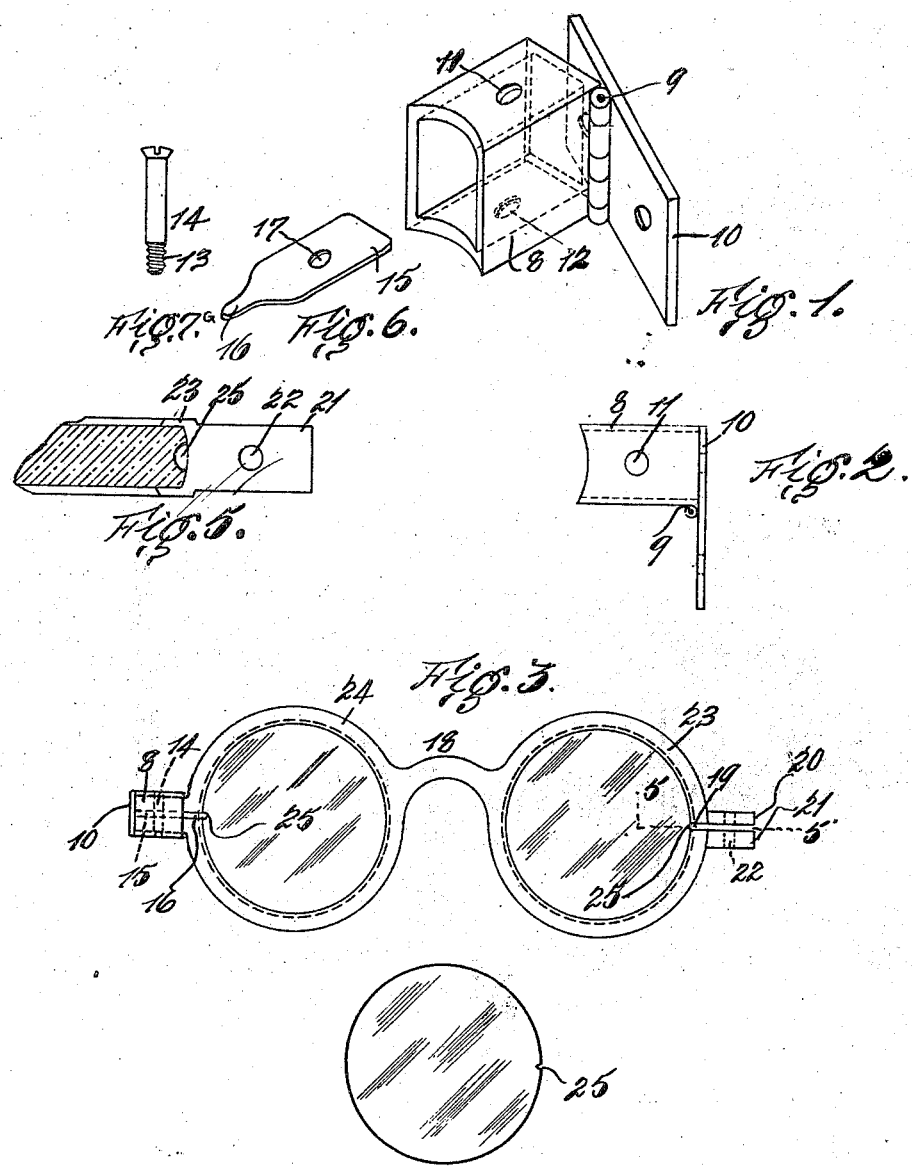

ELMER E. SHREINER, OF BROOKLYN, NEW YORK.

HINGE FOR EYEGLASS OR SPECTACLE FRAMES.

1,342,973.

Specification of Letters Patent.

Patented June 8, 1920.

Application filed August 1, 1919. Serial No. 314,734.

*To all whom it may concern:*

Be it known that I, ELMER E. SHREINER, a citizen of the United States of America, residing at Brooklyn, Kings county, State of New York, have invented certain new and useful Improvements in Hinges for Eyeglass or Spectacle Frames, of which the following is a full, clear, and exact description.

This invention relates to improvements in hinges for eye glass or spectacle frames. One of the objects of the invention is to provide a hinge consisting of a retaining device for frames that are split in order to insert a lens; that is to say, a device that is arranged to bind the split portion together after a lens has been inserted.

My improved device is intended more especially for frames which are made out of celluloid, horn, rubber, tortoise shell or other similar material. A further object of the invention is to obviate the necessity of the application of heat to expand a frame in order to fit a lens thereto. Application of heat is not desirable or certain in its results; it ofttimes distorts the frames or spoils the luster thereof therefore necessitating repolishing. I am aware that hinges have been applied to frames made out of the above named material by rivets and even screws, said screws engaging threaded holes in the frame. Owing to the relatively soft nature of the material of these frames, the threads soon give out and ofttimes strip; hence this form of securement is not popular or desirable. Riveting hinges to these frames is also objectionable as the splitting of the frames is liable to occur. The seating of eye glass lenses in the frames is an exacting operation, as the lenses have to be shifted to cause the focal axis to be properly positioned. With the present form of frame frequent heating is necessary, producing the undesirable results above mentioned.

My improved attachment permits of the shifting of the lens without in the least injuring the frame. Furthermore, my improved attachment is removable, that is to say, is normally adapted to be removed from the frame at will; hence a new lens can be placed in the frame without any difficulty. My improved device is attached to a frame solely by a removable screw and is not permanently secured to the frame.

I will now proceed to describe my invention in detail, reference being had to the accompanying drawing, wherein:

Figure 1 is a perspective view of my improved device;

Fig. 2 is a top plan view thereof;

Fig. 3 is a front view of a spectacle frame, illustrating one side thereof as having applied thereto my improved device, the other side being illustrated as it will appear before the securing device is applied thereto;

Fig. 4 is a detail view of a lens;

Fig. 5 is an enlarged fragmentary sectional view, the section being taken on a line 5—5 in Fig. 3;

Fig. 6 is a perspective view of the lens engaging member; and

Fig. 7 is a detail view of the locking screw.

As herein arranged, my improved device consists of a box-member 8 having hinged thereto at 9 a plate 10 arranged to be secured to a temple member of the spectacle. The box-member 8 is provided with alining openings 11 and 12, the hole 12 being threaded to engage the threaded end 13 of a locking screw 14. A further element of the device consists of a plate 15 carrying a tongue 16, said plate being provided with an opening 17 for the free passage therethrough of the screw 14. A spectacle frame is indicated by 18, said frame being split at 19 and provided with lips 20 and 21 each containing a hole or opening 22, said holes being in alinement. As can be seen at the left of Fig. 3, the box 8 receives the lips 20 and 21, the tongue plate 15 being located between said lips, the tongue 16 thereof projecting inwardly slightly beyond the inner surface of the rim members 23 and 24 to engage a notch 25 cut in the edges of the lenses, (see Fig. 4,) after the lenses have been properly positioned in the frames. The screw 14 passes through one of the walls of the box 8, the lips 20 and 21, and through plate 15, the threaded end of the screw engaging the threaded opening 12 in the box 8. To insert the lips 20 and 21 in the box, they will be pinched together. Before the screw 14 is inserted or the plate 15 positioned, the lenses will be rotated or shifted in the frame to properly position same. When properly positioned, a notch, such as is indicated by 25, will be cut in the edge of the lens. After said notch has been cut, plates 15 will be positioned either by forcing same into gap 19, from the outer end of the box, or by removing said box, to cause the tongue 16 to engage notch 25 in the adjacent lens. After plate 15 has been positioned, screw 14 will be passed through the alining openings in box 8, plate 15 and lips 20 and 21 and screwed home, after which the frames 23 and 24 will be firmly pressed against the lenses; plate 15 and tongue 16 will prevent the lens from rotating.

It will be plainly evident that my improved combined hinge and fastening device is not a permanent fixture and can be easily removed, by removing screws 14, after which the boxes can be removed for the purpose of fitting new lenses in the frames or for any other purpose.

What I claim and desire to secure by Letters Patent is—

1. In combination with a split celluloid frame for eyeglass lenses having projections adjacent the split portions, fastening means to engage said projections and surround same, and means to releasably secure the projection engaging means to said projections.

2. In combination with a split celluloid frame for eyeglass lenses having projections adjacent the split portions, fastening means to engage said projections and surround same, means to releasably secure the projection engaging means to said projections, and a plate hinged to said projection engaging means for the attachment thereto of a celluloid temple.

3. In combination with a split celluloid frame, projections carried thereby adjacent the split portions, a lens carried by the frame, means to engage said projections and surround same, means to releasably connect said projections and fastening means, and an independent tongue member connected with the fastening means to engage said lens to prevent rotation thereof.

4. In combination with a split celluloid frame, projections carried thereby adjacent the split portion, a lens carried by the frame having a notch in the edge thereof, a box to receive said projections and maintain said frame closed upon said lens, a plate located between said projections engaging the notch in the lens, and means to secure the box, plate and projections together.

5. In combination with a split celluloid frame, projections carried thereby adjacent the split portion, a lens carried by the frame having a notch in the edge thereof, a box to receive said projections and maintain said frame closed upon said lens, a plate located between said projections engaging the notch in the lens, means to secure the box, plate and projections together and a plate hinged to said box arranged to receive a celluloid temple.

6. A fastening device for split celluloid frames for eyeglass lenses having projections adjacent the split portion, a box to receive said projections and firmly engage same, and a binding screw carried by the box, passing through said projections.

Signed at New York city, N. Y., this 30 day of July, 1919.

ELMER E. SHREINER.

Witnesses:
BERTHA HOLEN,
EDWARD A. JARVIS.